United States Patent [19]
MacDonald

[11] Patent Number: 5,254,977
[45] Date of Patent: Oct. 19, 1993

[54] COLOUR DISPLAY

[75] Inventor: Lindsay W. MacDonald, Leighton Buzzard, England

[73] Assignee: Crosfield Electronics Ltd., England

[21] Appl. No.: 911,382

[22] Filed: Jul. 13, 1992

Related U.S. Application Data

[63] Continuation of Ser. No. 527,902, May 24, 1990, abandoned.

[30] Foreign Application Priority Data

Jun. 12, 1989 [GB] United Kingdom ............... 8913445

[51] Int. Cl.⁵ .............................................. G01G 1/28
[52] U.S. Cl. ..................................... 345/150; 358/81; 345/186
[58] Field of Search ............... 340/701, 703, 799, 798; 358/81, 78, 89; 395/131

[56] References Cited

U.S. PATENT DOCUMENTS

| | | | |
|---|---|---|---|
| 4,710,806 | 10/1987 | Iwai et al. | 358/78 |
| 4,721,951 | 1/1988 | Holler | 340/701 |
| 4,751,446 | 6/1988 | Pineda et al. | 340/703 |
| 4,843,573 | 6/1989 | Taylor et al. | 340/701 |
| 4,908,779 | 3/1990 | Iwata | 340/703 |
| 5,003,299 | 3/1991 | Batson et al. | 340/701 |

OTHER PUBLICATIONS

I. D. Judd et al., IBM Technical Disclosure Bulletin, vol. 26, No. 7A, Dec. 1983, pp. 3409-3418, "Multiple Pseudo Color Lookup Tables in Raster Graphic and Image Displays".

Philip K. Robertson, IEEE Computer Graphics & Applications, Sep. 1988, pp. 50-64, "Visualizing Color Gamuts: A User Interface for the Effective Use of Perceptual Color Spaces in Data Displays".

Primary Examiner—Ulysses Weldon
Assistant Examiner—Doon Yui Chow
Attorney, Agent, or Firm—Sughrue, Mion, Zinn, Macpeak & Seas

[57] ABSTRACT

A method of displaying a selected section of an N-dimensional color space uses two memories (14,16). The first memory (14) stores memory addresses of the second (16). The second memory (16) stores data defining color at addresses corresponding to the selected section and background color at all other addresses. The defined colors and background are output to a display (11) so that the background areas blend with the existing background and only the color of the selected section is redrawn not the whole image.

7 Claims, 7 Drawing Sheets

COLOUR DISPLAY

This is a continuation of application Ser. No. 07/527,902 filed May 24, 1990 is now abandoned.

FIELD OF THE INVENTION

The invention relates to a method of displaying in respective regions of a display the colours defined by a selected section of an N-dimensional colour space.

DESCRIPTION OF THE PRIOR ART

In many modern graphical applications of computer systems, a colour image is presented on a video monitor for inspection or correction. The image may be input directly, for example by means of a television camera; or may be captured from a photograph, for example by means of a rotary drum scanner; or may be created within the computer system, for example by an electronic paint program. Irrespective of its origin, however, the image portrayed on a raster display is always represented internally as an array of pixels, corresponding to a grid of spatial positions on the display screen. Each pixel is held in a memory cell consisting of one or more bits of information. For a simple black-and-white image, one bit per pixel suffices. For a grey-level monochrome image, up to 8 bits per pixel may be used, depending on the number of levels of lightness and darkness required.

For coloured images, three colour components (typically red, green and blue) must be stored for each pixel. By assigning 8 bits to each colour, a total of over 16 million colours can be displayed. This structure, however, though conceptually simple, may lead to an expensive product. For example at typical current display resolutions of 1024 by 1024 pixels, 3 megabytes of memory would be required for the frame store.

In many applications, such as colour-coded information displays, there is a need for only a small number of colours to be displayed simultaneously This can be achieved by assigning only a few bits per pixel in the frame store and using the pixel values to address a look-up table that determines the actual colour to be displayed. The look-up table may still produce 8 bits each for red, green and blue, providing a selection from the full range of over 16 million colours. With 4 input bits per pixel, the table selection is limited to 16 different colours at any one time; with 8 bits per pixel, up to 256 different colours may be obtained by appropriate loading of the look-up table. Having fewer bits per pixel, in addition to reducing the memory requirements of the display frame store, also reduces the storage requirements for an image on disk or other backing store, with correspondingly reduced transfer times. Recent advances in image coding have shown that even for full colour scenes, very realistic colour rendition may be achieved by suitable coding of the image with a palette of only 256 colours as described in U.S. Pat. No. 4,668,980.

The use of look-up tables to permit the selection of colours from a larger video colour palette is well known (see, for example, "Computer Graphics, Systems & Concepts", R. Salmon & M. Slater, Addison-Wesley, London 1987, pp. 561-2). Look-up tables are also used in digital electronic imaging equipment for applying corrections to the separate colour components of an image, as disclosed in our U.S. Pat. No. 3,893,166. In video display equipment they may serve the same purpose, either to correct for the gamma characteristics of the monitor (see "Fundamentals of Interactive Computer Graphics", Foley & Van Dam, Addison Wesley, Reading Mass., 1983, pp. 594-7) or to linearise the density range of a monochrome image as described in European Patent No. 0,017,553. Look-up tables have further been used in computer graphic systems to allow the overlay combination of two images without alteration of the pixel data as described in U.S. Pat. No. 4,484,187.

In IBM Technical Disclosure Bulletin Vol. 26 No 7A December 1983 multiple graphic windows on a single display screen each have their own pseudo-colour look-up table which can be selected by deriving an index from X,Y screen coordinate values. The look-up tables are preset for the requirements of their particular window such as text, graphics etc.

In modern computer-controlled systems for electronic "painting", video special effects and image colour correction, it is a common requirement for the operator to select a colour for a subsequent 'paint' or 'fill' operation. This is typically achieved by the display of a pre-defined range of colours, such as the commercial Pantone system, or by allowing the operator to mix and blend colours using a direct video analogue of the artist's paint palette (see, for example, U.S. Pat. No. 4,524,421).

When colour adjustment is required, for example in matching the coloured areas of two different scenes, or achieving a visual balance between the various elements of a composition, the operator needs suitable perceptual controls over the colour. Neither selection from a pre-defined range nor the paint-mixing metaphor is sufficient. Nor is it generally satisfactory to specify a colour in terms of the red, green and blue primary colours of the monitor. What is needed is a set of colour coordinates that corresponds closely to the natural attributes of the human visual system. Suitable candidates are the Munsell system, the CIE $L^*u^*v^*$ system, and the Hunt LCH system (see "Measuring Colour", R. W. G. Hunt, Ellis Horwood, Chichester UK, 1987). In all cases these separate lightness from the chromatic components. An image interpretation system based on Intensity, Hue and Saturation was successfully demonstrated some years ago (U.S. Pat. No. 4,183,046).

The key to the effective use of perceptual colour spaces in practical displays is providing the operator with an appropriate interface that allows visualisation of the display device's colour gamut (see "Visualising Colour Gamuts", P. K. Robertson, IEEE Computer Graphics & Applications Vol. 8 No. 5, pp. 50-64, September 1988). This implies both presenting the colour space in a form that is easily interpreted and giving the operator controls to allow him or her to "navigate" through the space to locate the colour most appropriate for the application.

The most natural and usable form of presenting a perceptual colour space on a display screen is as a two-dimensional cross-section through the irregular solid representing the device gamut in three-dimensional colour space. The operator is then provided with a control over the third dimension, conceptually a "Z axis" perpendicular to the plane of the screen. An example would be to display all the colours that can be achieved at a given lightness, with the viewer looking along the lightness axis and able to "fly through" successive colour planes at different levels of lightness.

In order to be fully interactive, the display must respond within 50 milliseconds to the operator's command, typically determined by the position of a hand control such as a mouse. This requirement demands a high level of performance from the display processor, if the data in the display frame store is to be modified for each setting of the control. For example, if only half the pixel data of a 1024 by 1024 display needs to be updated in 1/20th of a second, then a speed of 10 million pixels per second is indicated. This is currently beyond the power of all but the most expensive graphics supercomputers, even if the colour coordinate data has been pre-computed.

SUMMARY OF THE INVENTION

In accordance with one aspect of the present invention, a method of displaying in respective regions of a display the colours defined by a selected section of an N-dimensional colour space comprises a preliminary step of storing in a first memory, for each region, an address of a second memory; subsequently determining the section of the colour space to be displayed, storing at each address in the second memory corresponding to a region which is to display a colour of the selected section data defining the colour and at each address corresponding to an unused region data defining a background colour; and displaying on the display the colours defined in the second memory in the corresponding regions and elsewhere the background colour.

In accordance with a second aspect of the present invention, apparatus for displaying a selected section of an N-dimensional colour space comprises a display for displaying in respective regions of the display the colours defined by the selected section; a first memory and a second memory, the first memory storing, for each region, an address of the second memory; and a processor for selecting under operator control a section of the colour space to be displayed, the processor storing at each address in the second memory corresponding to a region which is to display a colour of the selected section data defining the colour and at each address corresponding to an unused region data defining a background colour; and displaying on the display the colours defined in the second memory in the corresponding regions and elsewhere the background colour.

The invention solves the problem of conventional methods of and apparatus for displaying selected sections of an N-dimensional colour space by making it necessary to change only the colour to be displayed in each region and not to redraw the entire image on the display.

This is accomplished by storing in respective addresses in the second memory the colours needed by the selected section, and storing in addresses corresponding to regions unused by the set of colours the background colour; and displaying on the display the colours defined in the second memory, in the corresponding regions. Those regions associated with the background colour will then merge with the background and hence not be apparent.

Typically, the N-dimensional colour space is a three-dimensional colour space and the selected section displayed is two-dimensional. However, it is possible that the selected section could be one-dimensional.

Preferably, the first memory is in the form of a raster frame store and the second memory is in the form of a look-up table.

Typically, the display is in the form of a cathode ray tube video monitor. However, any conventional colour display could be used such as a colour liquid crystal display.

BRIEF DESCRIPTION OF THE DRAWINGS

An example of a method of and apparatus for displaying a selected section of an N-dimensional colour space in accordance with the present invention will now be described with reference to the accompanying drawings, in which.

EMBODIMENT

Figure 1:
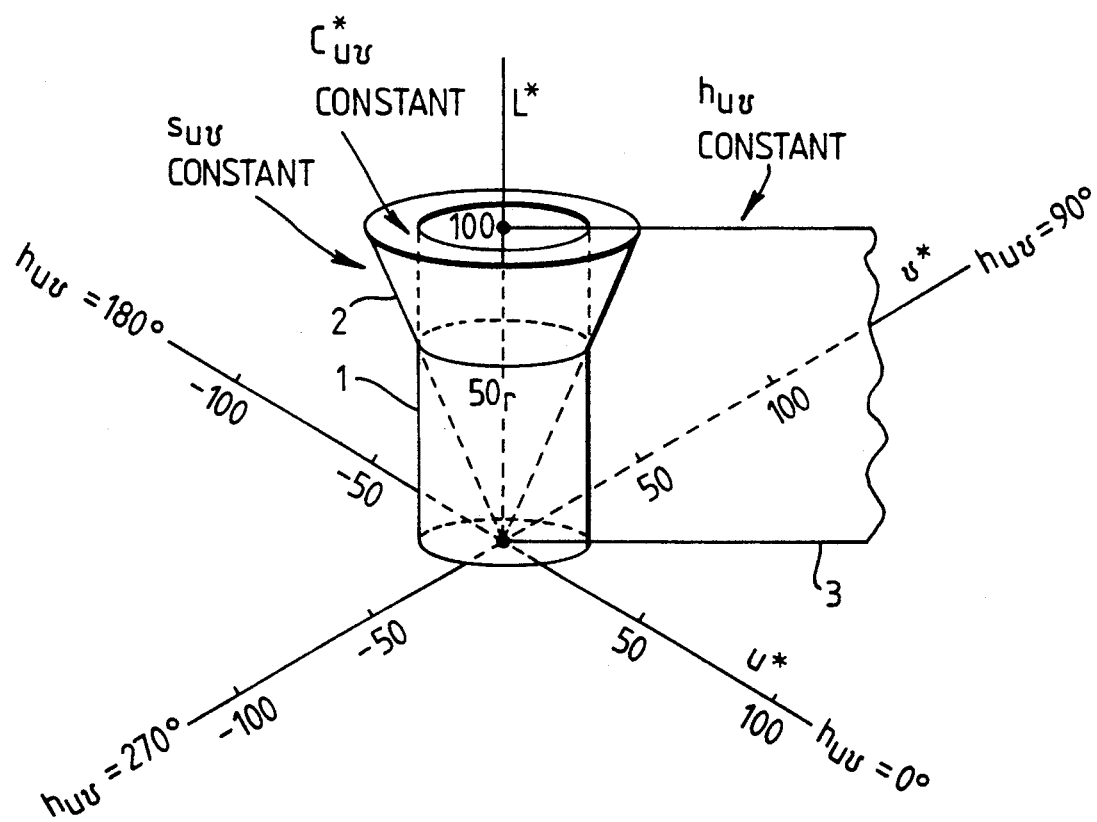
FIG. 1 shows a representation of a three-dimensional colour space.

FIG. 1 shows a representation of a three-dimensional colour space. The particular colour space shown is commonly known as the 1976 CIELUV space.

The $L^*$ axis is the lightness axis and varies from 0 (black) to 100 (white). The cylinder 1 labelled $C^*_{uv}$ is a plane of constant chroma and the cone 2 labelled $s_{uv}$ is a plane of constant colour saturation. The $u^*$ axis and the $v^*$ axis specify the chroma at a given lightness level and the angle denoted by $h_{uv}$ represents the hue. For example, the hue at $h_{uv}=0°$ is red and the hue at $h_{uv}=180°$ is cyan. The plane 3 labelled $h_{uv}$ represents a plane of constant hue with variations only in chroma and lightness.

Figure 6A:
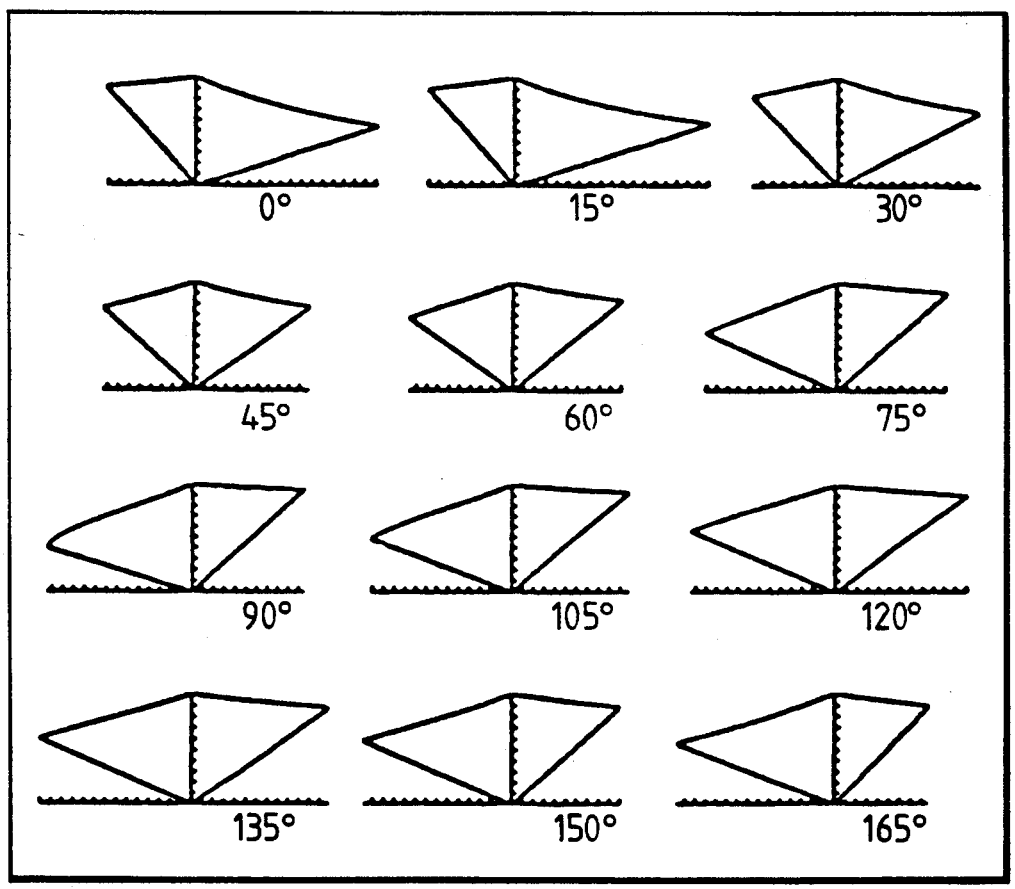
Figure 6B:
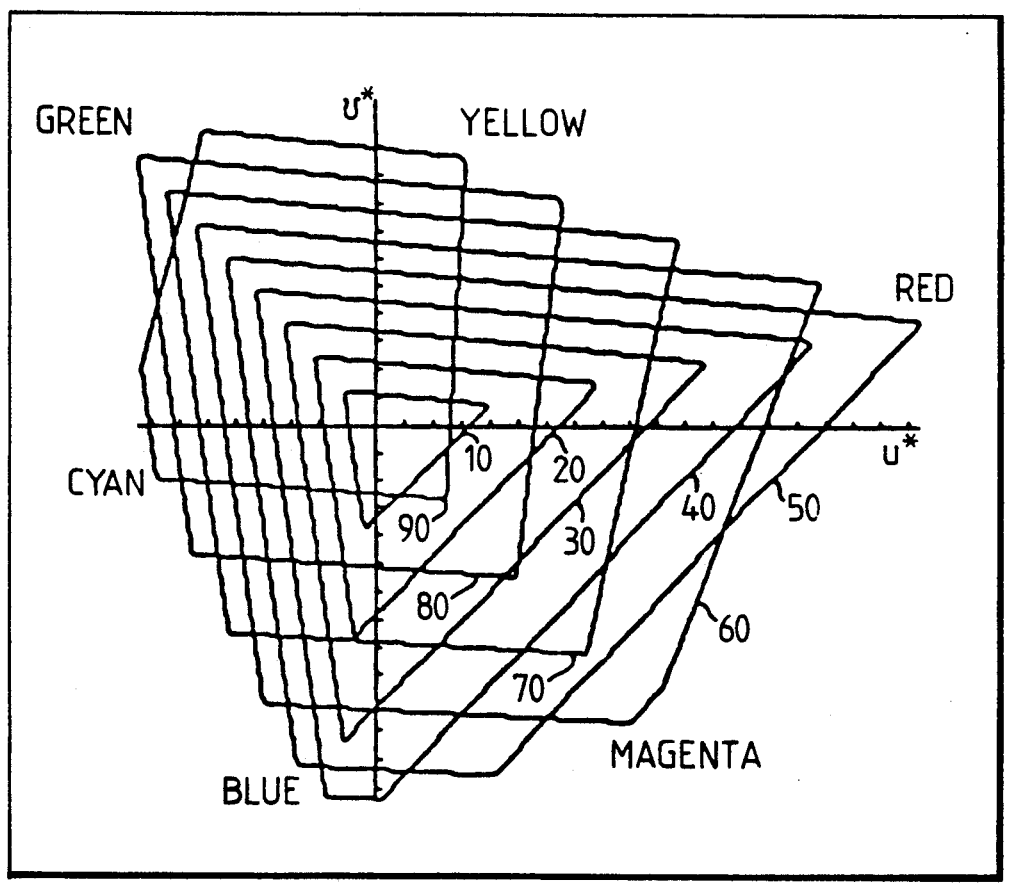

For a particular device or process, the range of reproducible colours can be represented as the set of all points within an irregular solid in three-dimensional colour space, known as the device gamut. The form approximates crudely to a double cone, because at the light and the dark ends of the lightness axis the range of colours shrinks to a point, while at medium levels of the lightness the range of reproducible colours is greatest. FIGS. 6A and 6B show views of the gamut boundary of the CIE $L^*u^*v^*$ colour space for the phosphors of a typical cathode ray tube display monitor: FIG. 6A shows lightness against chroma for varying hue angle in 15 degree increments, and FIG. 6B shows the $u^*-v^*$ plane for varying levels of lightness from 10 to 90 in increments of 10 superimposed onto each other.

The number of colours that can be reproduced within the gamut depends on the nature of the device. In the mathematical definition of a colour space such as CIE-$*u^*v^*$ there is an infinite number of colours. For a physical device such as a colour monitor, however, the number will usually be limited by the number of quantising levels in the digital-to-analogue converters (DAC) of the video output stage. Typically 8 bits are provided for each of the red, green and blue guns in the monitor, giving a total of over 16 million theoretical colour combinations. In practice, the human visual system is capable of discriminating only about half a million different colours, more or less depending on viewing conditions. It is convenient to use units of "just noticeable differences" (JND) along each of the axes, resulting in a uniform perceptual colour space.

For the display of a two-dimensional cross-section through the colour gamut, it is necessary to indicate the gamut boundary and a selection of the colours contained within it. For a 24-bit display frame store it would theoretically be possible to show a different colour at every pixel position. However, for colour selection and matching tasks it is generally better to display a limited number of colour regions, each region containing pixels of a constant colour. Typically, between 10 and 20 levels along each axis are sufficient, resulting in at most a few hundred different colours that need to be displayed simultaneously for a given cross-section through the colour space. It is thus feasible to achieve effective results with an 8-bit frame store and colour palette lookup table.

Figure 2:
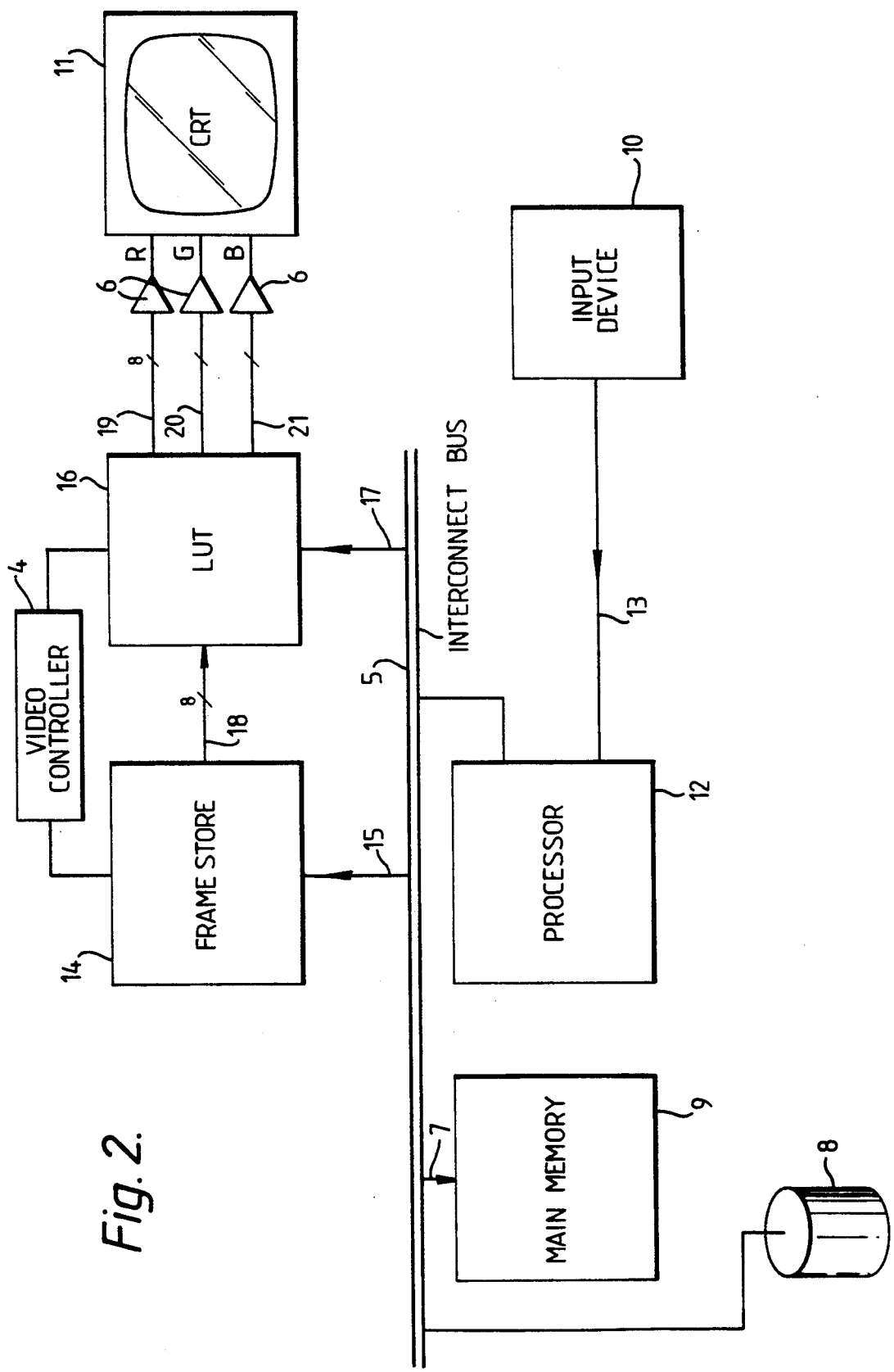
FIG. 2 is a block diagram of the apparatus.

FIG. 2 shows such apparatus for displaying a selected section of the three-dimensional colour space shown in FIG. 1. The apparatus comprises an input device 10 for an operator to select manually a plane of the three-dimensional colour space to be displayed on the cathode ray tube (CRT) 11. The input device 10 sends a signal representative of the section to be selected to the processor 12 via the line 13. The input device 10 could be, for example, a keyboard or a manual XY positioning device such as a digitising table or mouse.

The processor 12 interfaces via an interconnect bus 5 to a frame store 14 via a line 15, a look-up table (LUT) 16 via a line 17 and a main memory 9 via a line 7. The frame store 14 would typically have a memory capacity of 1024×1024 pixels in a one-to-one correspondence with the pixels on the CRT 11 and pass pixel data to the LUT 16 via an 8-bit parallel line 18. The LUT 16 is connected to the CRT 11 via three 8-bit parallel lines 19, 20, 21 which transmit the red, green and blue colour signals respectively to the CRT 11 via the DAC's 6. Timing and synchronisation signals for the frame buffer 14 and LUT 16 are provided by a video controller 4. The main memory 9 contains data that may be downloaded to the LUT 16 via the interconnect bus 5 under control of the processor 12.

Figure 3:
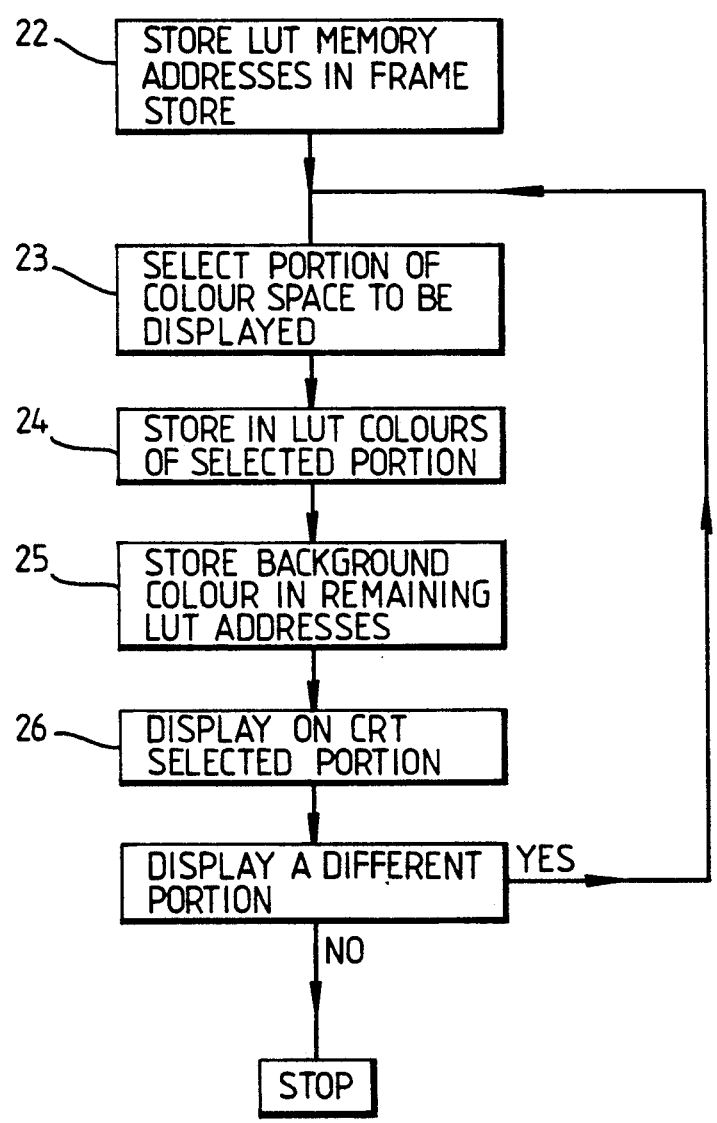
FIG. 3 is a flow diagram showing the operation of the apparatus shown in FIG. 2.

In use, the processor 12 initially fills, step 22 (see FIG. 3), the frame store 14, via the line 15, with an image of colour regions represented as addresses of memory locations in the LUT 16. That is each pixel within a region corresponds to a memory location in the frame store 14 and each memory location holds a memory address of the LUT 16.

The processor 12 also retrieves from a disk store 8 a file containing precomputed colour data, representing the red, green and blue values corresponding to each region of the three-dimensional colour space. These values will have been calculated from a knowledge of the mathematical formulae for the colour space, the equivalent colour temperature of the reference white, the gamma characteristics and phosphor chromaticity coordinates for the monitor (or corresponding data for the transfer functions and primaries of a different type of device), and the sampling interval chosen for the representation of each axis The entire file is held in the main memory 9, in readiness for rapid extraction and transfer of appropriate values to the LUT 16, according to the section of the colour space to be displayed.

An operator may then select a section of the three-dimensional colour space which he wishes to be displayed on the CRT 11, via the input device 10. This is shown as step 23 in FIG. 3. When the section to be displayed has been selected the processor 12 determines the addresses of the appropriate colours in the main memory 9. The processor 12 then downloads the red, green and blue data corresponding to the colours, via the line 17, and stores, step 24, the colour data at the memory locations in the LUT 16 corresponding to the memory addresses already stored in the frame store 14.

Although the three-dimensional colour space shown in FIG. 1 is depicted as a uniform, regular cylinder and cone, this is not normally the case. Generally, for any given lightness level, saturation is reached at different chroma levels for different hues. Hence, there are always some colour regions in the image stored in the frame store 14 which will not correspond to a reproducible colour, that is, which are outside the gamut boundary of the current section. Therefore, the processor 12 stores, step 25, a background colour in the memory addresses in the LUT 16 corresponding to these colour regions.

The video controller 4 continually cycles the frame store 14 to output its contents via the line 18 to the LUT 16. The LUT memory addresses in the frame store 14, which represent the colour regions, then address the memory locations in the LUT to obtain the appropriate colour data and the resulting image is displayed step 26 on the CRT 11 via the control lines 19-21. Areas outside these regions will display the background colour, via an unmodified location in the LUT 16.

Figure 4:
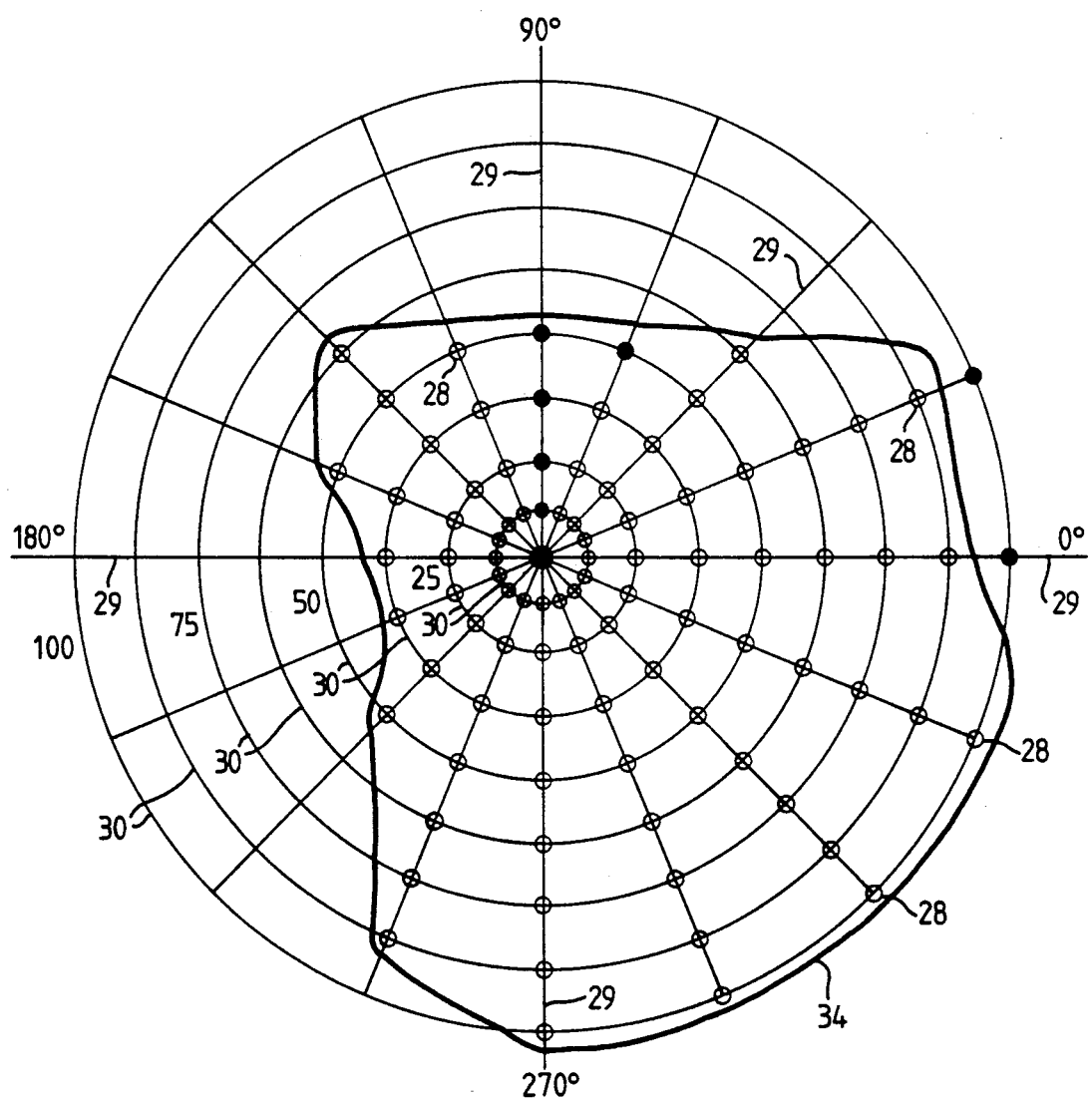
FIG. 4 shows a first example of a representation of a selected section of the colour space shown in FIG. 1 as displayed on the apparatus shown in FIG. 2.

If for example, the operator has chosen to display a horizontal section through the colour space shown in FIG. 1 (i.e. constant L), the image displayed on the CRT 11 would be similar to that shown in FIG. 4. This is a typical display for a 50% lightness level and the colour regions are denoted by the circles 28, though any other shape could be used. The different angles of constant hue are represented by the lines 29 and vary in 22.5° steps from 0° to 360°. Although other steps of 15°, 18°, 20° or 24° could be used. The chroma levels are denoted by the concentric circles 30 and vary from 0 to 100 in steps of 12.5 although other steps of 10 or 20 could be used. As can be seen from FIG. 4 and as explained above it is not necessary to utilise all the intersections of the hue and chroma lines as a number of these do not correspond to real colours at $L^* = 50\%$. This is particularly true in the cyan region, represented by a hue angle of 180°, where the maximum chroma it is possible to obtain is about 45 (see FIGS. 6A and 6B). Hence, the colour regions denoted by the intersections which do not display a colour within the gamut 34 will be assigned the background colour.

The operator having obtained his display as shown in FIG. 4 may then wish to change the lightness level in order to display a different section of the colour space. The operator will select a different lightness via the input device 10. The processor 12 determines the new set of colours for the new selected portion, downloads them from the main memory 9 and stores (step 24) these new colours in the appropriate memory location in the LUT 16. This avoids the need for the image of the colour regions in the frame store 14 to be redrawn by the processor 12 as the colour regions address the same memory locations as before in the LUT 16, but the memory locations of the LUT 16 now contain colours corresponding to the new selected section. Hence, the colour regions 28 displayed on the CRT 11 change colour according to the new colours of the selected section stored in the LUT 16. By this means it is possible to change the display at video frame rates (typically 60 frames per second).

Figure 5:
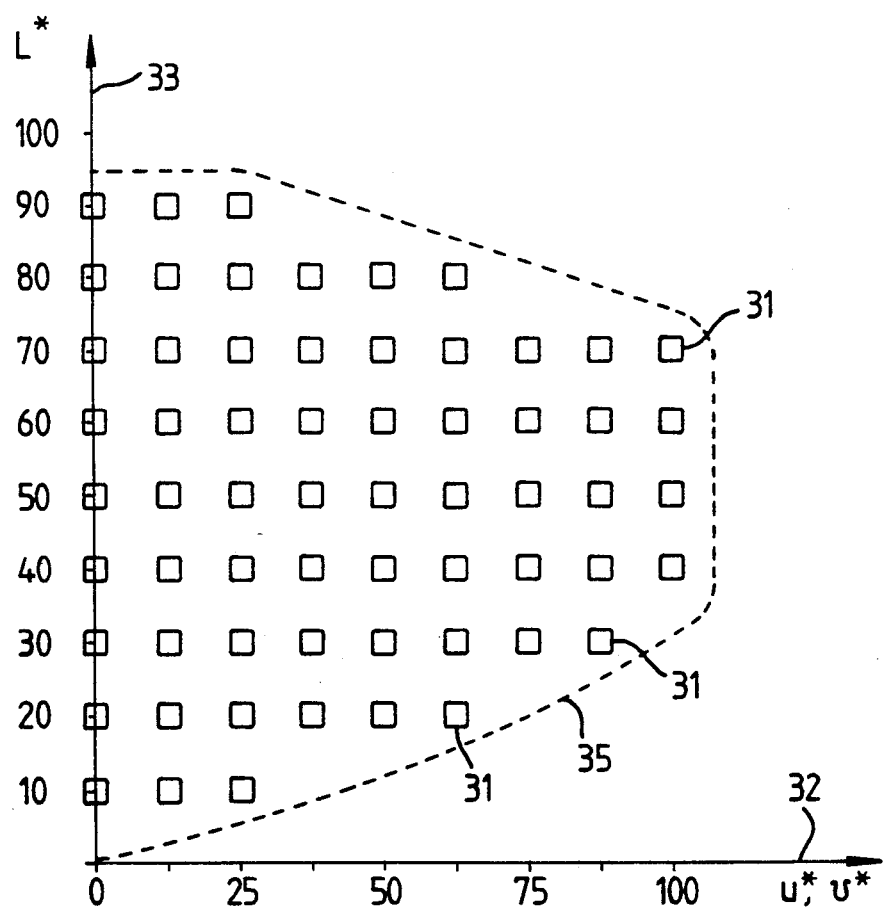
FIG. 5 shows a second example of a representation of a selected section of the colour space shown in FIG. 1 as displayed on the apparatus shown in FIG. 2; and, FIGS. 6A and 6B show the sets of two-dimensional cross-sections through the CIELUV gamut of the apparatus shown in FIG. 2.

Alternatively, the operator may initially choose to select a plane 3 (see FIG. 1) of constant hue, as opposed to a plane of constant lightness. In this case the processor would initially store a different image of colour regions in the frame store 14 to correspond to the different selected plane, and the CRT 11 would display, step 26, the selected section as shown in FIG. 5. In this case the colour regions are represented by the squares 31, although any other shape could be used. The lightness L* varies from 0 to 100 and the chroma of u*, v* varies from 0 to greater than 100. This figure represents a vertical plane 3 through the colour space shown in FIG. 1 with a constant hue angle of 0° which corresponds to the colour red. Regions outside the gamut boundary 35 for this section are assigned the background colour.

An operator may change the hue angle of the display shown in FIG. 5 via the input device 10 in order to display different colours, in a similar manner to the way in which an operator may change the lightness level displayed in FIG. 4. Again this obviates the need to redraw the colour region image stored in the frame store 14 by only making it necessary to re-store different colours in the LUT 16. Again this enables a very rapid change in the colours displayed on the CRT Il, with interactive response at video frame rates being readily achievable.

A further aspect of the invention is that an indexing procedure may be employed to facilitate the display of colour sections where there are more regions on the section grid than there are locations in the palette look-up table 16. This takes advantage of the fact that for any given section many of the peripheral (outer) regions correspond to colours outside the gamut boundary. By taking the logical union, across all levels of the third (variable) dimension, of all the regions that are inside the two-dimensional gamut, a map of displayed regions can be constructed. Each region that is displayed for at least one level of the variable dimension is then assigned a unique number or memory address, in the look-up table; all other regions, which are not displayed for any level of the variable dimension, are ignored Only the former regions need to be drawn by processor 12 into the frame store 14 during the initial step 22, the remainder of the frame store will contain the index of the background colour.

For example, for the CIE L*u*v* model for a typical display monitor with white reference set to be D65 (i.e. daylight at 6500 degrees Kelvin) the sample intervals for the three axes were set as follows:

| DIMENSION | RANGE | INTERVAL | NUMBER |
| --- | --- | --- | --- |
| Lightness | 0–100 | 1 | 101 |
| Hue angle | 0–359 | 15 | 24 |
| Chroma | 0–140 | 10 | 15 |

A display of the hue-chroma section for variable lightness, of the type shown in FIG. 4, could then have a theoretical total of 15×24=360 regions. Use of the above indexing procedure by taking the union of regions for all 101 levels of lightness, however, indicated that only 208 regions were actually used. For the alternative display of the lightness-chroma section for variable hue angle (FIG. 5), displaying every fifth lightness level, the total of 21×15=315 possible regions reduced to 213 actual regions when the indexing procedure was applied. In each case, the number of actual regions could be represented comfortably in an 8-bit frame store with a 256-colour look-up table

I claim

1. A method of displaying in respective regions of a display, colours defined by a selected section of a colour space defined by N orthogonal axes, the method comprising:
    a) a first preliminary step of determining and storing data defining a set of displayable colours within the colour space, and a second preliminary step of storing addresses of a colour memory in locations of a frame tore corresponding to pixels of each region, wherein each region is defined by an array of pixels for each of which the same colour memory address is stored, the addresses for each region being different;
    b) subsequently:
        i) determining the section of the colour space to be displayed;
        ii) storing, at each address in the colour memory corresponding to a region which is to display a colour of the selected section, data defining the colour, and at each address corresponding to an unused region, data defining a common background colour by downloading data selected from the previously generated colour data into the colour memory; and
        iii) displaying on the display the colours defined in the color memory in the corresponding regions; and
    c) repeating step b) without repeating step a) so as to display other selected sections of the colour space.

2. A method according to claim 1, in which the N-dimensional colour space is a three dimensional colour space.

3. A method according to claim 1, wherein the section of the colour space is a two dimensional plane.

4. A method according to claim 1, wherein the regions are spaced apart.

5. Apparatus for displaying, in respective regions of a display, colours defined by a selected section of a colour space defined by N orthogonal axes, the apparatus comprising:
    a display;
    a frame store;
    a colour memory;
    a processor;
    a main memory in which is stored data defining a set of colours within the colour space which may be displayed, wherein said processor is adapted to download selected colour data from said main memory to said colour memory in response to the selection of a corresponding section of said colour space; and
    an input device,
    wherein data is stored in locations of the frame store corresponding to pixels of each region defining respective addresses of the colour memory, wherein each region is defined by an array of pixels for each of which the same colour memory address is stored, the addresses for each region being different, wherein the processor responds to instructions from an operator via the input device to determine the section of the colour space to be displayed, the processor storing, at each address in the colour memory corresponding to a region which is to display a colour of a selected plane, data defining the colour, and, at each address corresponding to an unused region, data defining a common background colour, whereby the display displays the colours defined in the colour memory in the corresponding regions, and wherein upon other sections of said colour space being selected by the operator, the processor reloads said colour memory without changing the content of said frame store.

6. Apparatus according to claim 5, wherein said colour memory includes a look-up table.

7. Apparatus according to claim 5, wherein the display comprises a cathode ray tube video monitor.

* * * * *